US006341255B1

(12) United States Patent
Lapidot

(10) Patent No.: US 6,341,255 B1
(45) Date of Patent: Jan. 22, 2002

(54) APPARATUS AND METHODS FOR PROVIDING ROUTE GUIDANCE TO VEHICLES

(75) Inventor: Dror Lapidot, Jerusalem (IL)

(73) Assignee: Decell, Inc., Wilmington, DE (US)

( * ) Notice: Subject to any disclaimer, the term of this patent is extended or adjusted under 35 U.S.C. 154(b) by 0 days.

(21) Appl. No.: 09/406,537

(22) Filed: Sep. 27, 1999

(51) Int. Cl.[7] ................................................ G06F 7/00

(52) U.S. Cl. ....................... 701/209; 701/117; 701/210; 340/905

(58) Field of Search ................................ 701/207, 209, 701/210, 213, 117–119; 340/905, 933–935, 988–989, 994; 455/456

(56) References Cited

U.S. PATENT DOCUMENTS

| | | | | |
|---|---|---|---|---|
| 5,177,685 A | * | 1/1993 | Davis et al. | 455/456 |
| 5,402,117 A | | 3/1995 | Zijderhand | 340/905 |
| 5,539,645 A | | 7/1996 | Mandhyan et al. | 701/119 |
| 5,689,252 A | | 11/1997 | Ayanoglu et al. | 340/991 |
| 5,732,383 A | | 3/1998 | Foladare et al. | 701/117 |
| 5,745,865 A | * | 4/1998 | Rostoker et al. | 701/117 |
| 5,845,227 A | | 12/1998 | Peterson | 701/209 |
| 5,933,100 A | | 8/1999 | Golding | 340/995 |

FOREIGN PATENT DOCUMENTS

| | | |
|---|---|---|
| EP | 0 763 807 | 12/2000 |
| WO | WO 98/12683 | 3/1998 |
| WO | WO 99/44183 | 9/1999 |

OTHER PUBLICATIONS

"DynaMIT:Task C Report"; Apr. 1, 1996; http://its.mit.edu/projects/dta/Taskc.html.

"DynaMit:Dynamic network assignment for the management of information to travellers"; Apr. 17, 1998; http://its.mit.edu/projects/dta/dynamit.html.

* cited by examiner

*Primary Examiner*—William A. Cuchlinski, Jr.
*Assistant Examiner*—Edward Pipala
(74) *Attorney, Agent, or Firm*—Abelman, Frayne & Schwab

(57) ABSTRACT

A route guidance system, for providing individualized route guidance to from at least one and up to each one of a plurality of selected individual vehicles, which are system participants, and which are moving in at least one traffic stream of a plurality of vehicles is disclosed. Various embodiments of the system commonly include a digital cellular operator, a route guidance web server, and a central traffic light computer. In addition, each vehicle that is a system participant, is provided with means, such as a cellular phone, for transmitting and receiving information, such as vehicle position, destination, and route information, as well as with means for displaying information, such as a recommended route of travel from the vehicle's current location to its destination. Certain embodiments of the system utilize satellite-provided photographic data showing traffic density. A method of providing rout guidance to vehicles is also disclosed.

50 Claims, 9 Drawing Sheets

440

| Road | Segment | Average Traffic Speed (kph) At $t=t_0$ | Average Traffic Speed (kph) At $t=t_1$ | Average Traffic Speed (kph) At $t=t_2$ | .... |
|---|---|---|---|---|---|
| A | 1 | 60 | 70 | 50 | .... |
| | 2 | 30 | 60 | 60 | .... |
| | 3 | 50 | 50 | 50 | .... |
| B | 1 | 80 | 60 | 70 | .... |
| | 2 | 90 | 90 | 80 | .... |
| | 3 | 90 | 80 | 60 | .... |
| | 4 | 85 | 90 | 90 | .... |
| | 5 | 90 | 90 | 90 | .... |
| C | 1 | 60 | 70 | 50 | .... |
| | 2 | 50 | 70 | 60 | .... |

APPARATUS AND METHODS FOR PROVIDING ROUTE GUIDANCE TO VEHICLES

FIELD OF THE INVENTION

The present invention relates to apparatus and methods for providing route guidance to vehicles.

BACKGROUND OF THE INVENTION

Navigation systems which compute a route for a vehicle designed to bring the vehicle from its current location to a desired location are known.

A document entitled "DynaMIT:Task C Report", describes a traffic assignment system and notes, inter alia, that "In an (ideal) system . . . where there is two-way communication between the traffic control center and every vehicle in the network, perfect information about the vehicle location and possibly its origin and destination, can be obtained. While such perfect systems are possible in the future, most existing surveillance systems are limited to vehicle detectors located at critical points in the network. The information provided by these traffic sensors therefore, must be used to infer traffic flows, queue lengths, incidents, etc., at all locations of the network."

Another document discussing pertinent technology is entitled "DynaMIT:DYnamic network assignment for the management of information to travellers."

The disclosures of all publications mentioned in the specification and of the publications cited therein are hereby incorporated by reference.

SUMMARY OF THE INVENTION

The present invention seeks to provide an improved route guidance system.

There is thus provided, in accordance with a preferred embodiment of the present invention, a route guidance system including a traffic velocity computer operative to receive the following information: a plurality of locations, separated by a known time interval, of at least one vehicle within traffic separating a moving vehicle's current location from the selected destination, and a route assigned to at least one vehicle within the traffic, and to compute at least one velocity characteristic of the traffic, and a route selecting computer operative to receive a selected destination of the moving vehicle and a current location of the moving vehicle, and to compute a route from the moving vehicle's current location to the moving vehicle's selected destination, at least partly as a function of the at least one velocity characteristic.

Also provided, in accordance with another preferred embodiment of the present invention, is a traffic velocity monitoring system including a representation of an area in which traffic travels, a vehicle location monitor operative to receive vehicle location information, from a multiplicity of moving vehicles, as to their current location, and a per-vehicle velocity computer operative to derive, from the vehicle location information and the representation, an average velocity of at least one individual moving vehicle from among the multiplicity of moving vehicles.

Further in accordance with a preferred embodiment of the present invention, the system also includes a global velocity computer operative to receive average velocities of each of a plurality of vehicles from the per-vehicle velocity computer and to compute therefrom an average velocity of traffic including the plurality of vehicles.

Additionally provided, in accordance with another preferred embodiment of the present invention, is a route guidance system including a traffic information accumulator operative to accumulate up-to-date information characterizing traffic including a route assigned to at least one vehicle within the traffic, and a route selecting computer operative to compute a route from a moving vehicle's current location to the moving vehicle's selected destination, at least partly as a function of the traffic characterizing information.

Further in accordance with a preferred embodiment of the present invention, the route computed by the route selecting computer is fed back to the traffic information accumulator and is employed by the accumulator to generate anticipated traffic information estimating characteristics of traffic separating a future location of the moving vehicle from the moving vehicle's selected destination.

Still further in accordance with a preferred embodiment of the present invention, the route selecting computer includes a dynamic route selecting computer operative to provide the moving vehicle with ongoing modifications of the route at least partly as a function of the anticipated traffic information.

Additionally in accordance with a preferred embodiment of the present invention, the route selecting computer randomly selects at least a portion of at least one vehicle's route from among several candidate route portions for that vehicle, the random selection being biased by the relative merits of the candidate route portions for the vehicle.

Further in accordance with a preferred embodiment of the present invention, the traffic information accumulator is also operative to receive up-to-date information characterizing permanent and/or transient road conditions in road segments separating the vehicle's current location from the vehicle's selected destination.

Further in accordance with a preferred embodiment of the present invention, the transient road conditions include states of multi-state traffic governing elements.

Still further in accordance with a preferred embodiment of the present invention, the multi-state traffic governing elements include at least one of the following: a traffic light having more than one possible schedule, and a digital sign displaying any of a plurality of route-guiding messages.

Further in accordance with a preferred embodiment of the present invention, the traffic information accumulator is operative to provide information to the multi-state traffic governing elements and the multi-state traffic governing elements are operative to select a state at least partly in response to the information.

Still further in accordance with a preferred embodiment of the present invention, the accumulator includes a traffic flow simulator operative to generate at least some of the anticipated traffic information.

Further in accordance with a preferred embodiment of the present invention, the information characterizing traffic includes quantitative information.

Still further in accordance with a preferred embodiment of the present invention, the route selecting computer includes a multiplicity of independent route selecting units located within each of a multiplicity of vehicles respectively.

Additionally in accordance with a preferred embodiment of the present invention, the route selecting computer includes a central unit operative to compute a route for each of a multiplicity of vehicles and to transmit each vehicle's route to that vehicle.

Also provided, in accordance with another preferred embodiment of the present invention, is a route guidance system including a traffic velocity computer operative to accept a plurality of locations, separated by a known time interval, of at least one vehicle within traffic separating the moving vehicle's current location from the selected destination, and to compute at least one velocity characteristic of the traffic, and a route selecting computer operative to receive a selected destination of a moving vehicle and a current location of the moving vehicle, and to compute a route from the moving vehicle's current location to the moving vehicle's selected destination, at least partly as a function of the at least one velocity characteristic.

Further in accordance with a preferred embodiment of the present invention, the route selecting computer is operative to compute and display an estimated arrival time for the moving vehicle.

Still further in accordance with a preferred embodiment of the present invention, the system also includes a route display unit operative to display to a driver of the moving vehicle, at least one driver direction derived from the route.

Also provided, in accordance with another preferred embodiment of the present invention, is a route guidance method including receiving the following information: a selected destination of a moving vehicle, a current location of the moving vehicle, and a plurality of locations, separated by a known time interval, of at least one vehicle within traffic separating the moving vehicle's current location from the selected destination, and a route assigned to at least one vehicle within the traffic, computing at least one velocity characteristic of the traffic, and computing a route from the moving vehicle's current location to the moving vehicle's selected destination, at least partly as a function of the at least one velocity characteristic.

Also provided, in accordance with another preferred embodiment of the present invention, is a traffic velocity monitoring method including providing a representation of an area in which traffic travels, receiving vehicle location information, from a multiplicity of moving vehicles, as to their current location, and deriving, from the vehicle location information and the representation, an average velocity of at least one individual moving vehicle from among the multiplicity of moving vehicles.

Also provided, in accordance with another preferred embodiment of the present invention, is a route guidance method including accumulating up-to-date information characterizing traffic including a route assigned to at least one vehicle within the traffic, and computing a route from a moving vehicle's current location to the moving vehicle's selected destination, at least partly as a function of the traffic characterizing information.

Further provided, in accordance with another preferred embodiment of the present invention, is a route guidance method including providing the following information: a selected destination of a moving vehicle, a current location of the moving vehicle, and a plurality of locations, separated by a known time interval, of at least one vehicle within traffic separating the moving vehicle's current location from the selected destination, computing at least one velocity characteristic of the traffic, and computing a route from the moving vehicle's current location to the moving vehicle's selected destination, at least partly as a function of the at least one velocity characteristic.

Also provided, in accordance with still another preferred embodiment of the present invention, is a route guidance system including a traffic quantifier operative to receive the following information: traffic location information describing a location of at least one vehicle within traffic separating a moving vehicle's current location from the selected destination, and a route assigned to at least one vehicle within the traffic, and to compute at least one quantitative characteristic of the traffic, and a route selecting computer operative to receive a selected destination of the moving vehicle and a current location of the moving vehicle, and to compute a route from the moving vehicle's current location to the moving vehicle's selected destination, at least partly as a function of the at least one quantitative characteristic.

Also provided, in accordance with another preferred embodiment of the present invention, is a route guidance method including receiving the following information: a selected destination of a moving vehicle, a current location of the moving vehicle, and a route assigned to at least one vehicle within the traffic, computing at least one quantitative characteristic of the traffic, and computing a route from the moving vehicle's current location to the moving vehicle's selected destination, at least partly as a function of the at least one quantitative characteristic.

Further provided, in accordance with yet another preferred embodiment of the present invention, is a route guidance system including a traffic quantification computer operative to provide a quantitative characterization of traffic separating the moving vehicle's current location from the selected destination, and a route selecting computer operative to receive a selected destination of a moving vehicle and a current location of the moving vehicle, and to compute a route from the moving vehicle's current location to the moving vehicle's selected destination, at least partly as a function of the quantitative characterization.

Further in accordance with a preferred embodiment of the present invention, the method also includes employing a global average velocity of a sample of moving vehicles to estimate average velocity of traffic.

Still further in accordance with a preferred embodiment of the present invention, the traffic characterizing information employed by the route selecting computer includes information regarding anticipated traffic.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
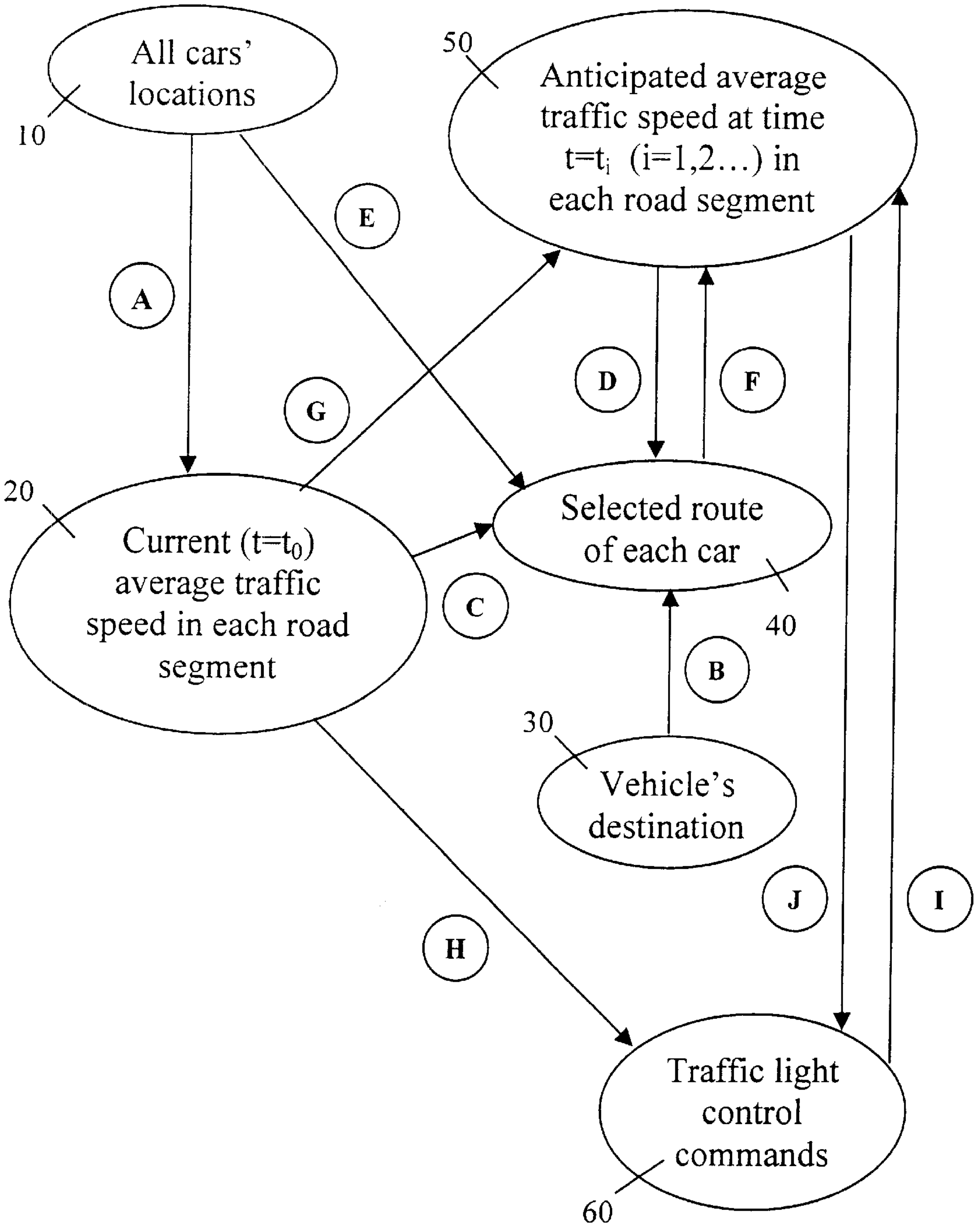
FIG. 1 is a data flow diagram of a driving route guidance system constructed and operative in accordance with a preferred embodiment of the present invention.

Reference is now made to FIG. 1 which is a data flow diagram of a driving route guidance system constructed and operative in accordance with a preferred embodiment of the present invention.

Data elements are represented as ellipses and arrows, marked by letters A–J, indicate the flow of data.

Arrow A indicates a typically periodic probe of vehicle locations, for all vehicles being served by the system or more typically, for only a sample of the vehicles being served by the system.

As each sample of vehicles is selected, the location of all vehicles in the sample is computed (e.g. by a digital cellular operator or by any other vehicle location source) at the beginning as well as at the end of some specified time period (e.g. one minute). In the case of digital cellular location vehicle location computation can be performed as a response to messages sent out by these vehicles' mobile phones at the beginning and at the end of this time period. Based on each car's locations at the beginning and at the end of the specified time period, provided to the system by a digital cellular operator or by any other vehicle location source, the system computes the average velocity of each car belonging to the sample during this time period. For each road segment and each time period the system derives, from the per-car velocity information, the approximate average velocity of all vehicles driving along the road segment during that time period.

Figure 5:
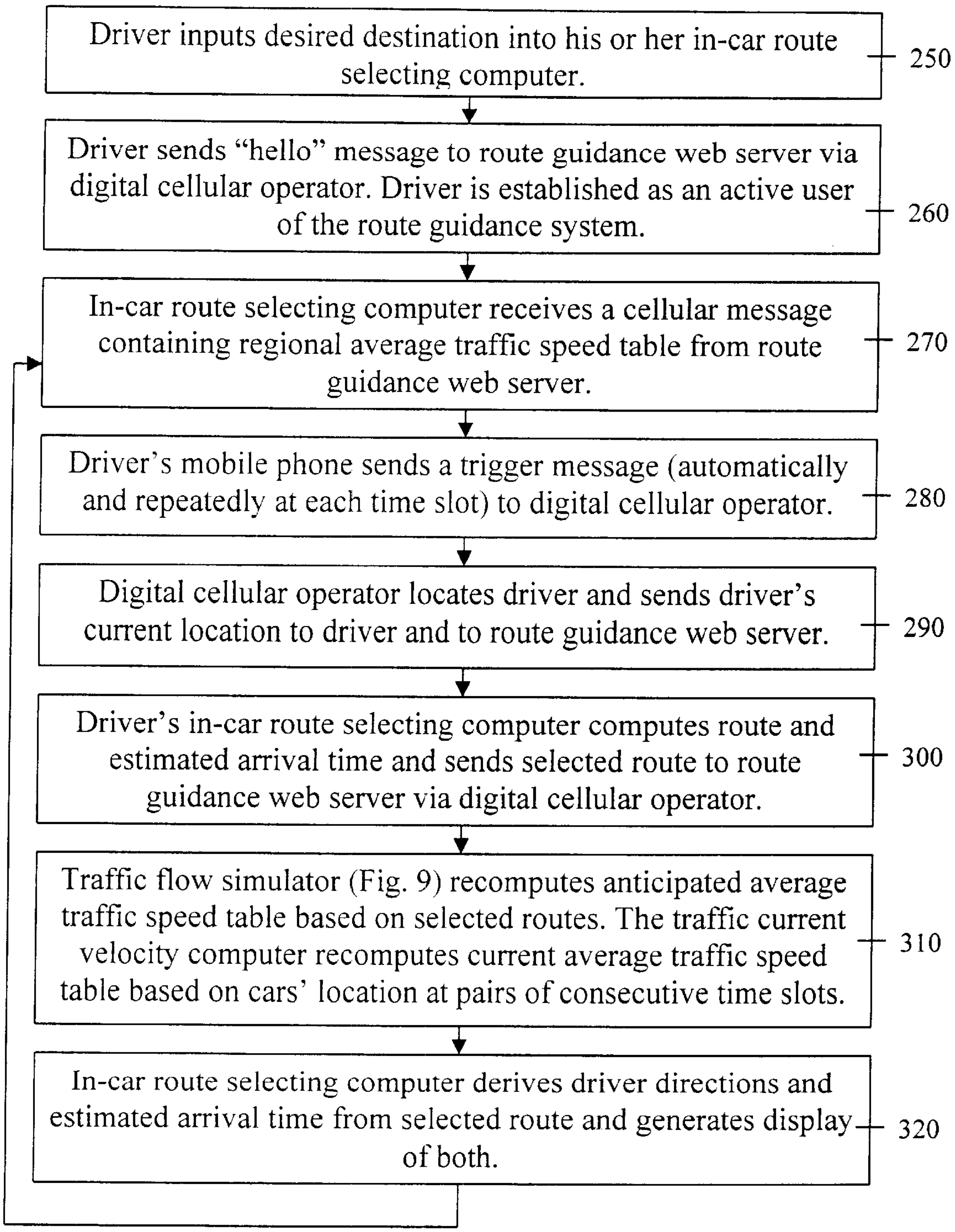
FIG. 5 is a simplified flowchart illustration of an individual driver's interaction with the route guidance system of FIG. 2.
Figure 6:
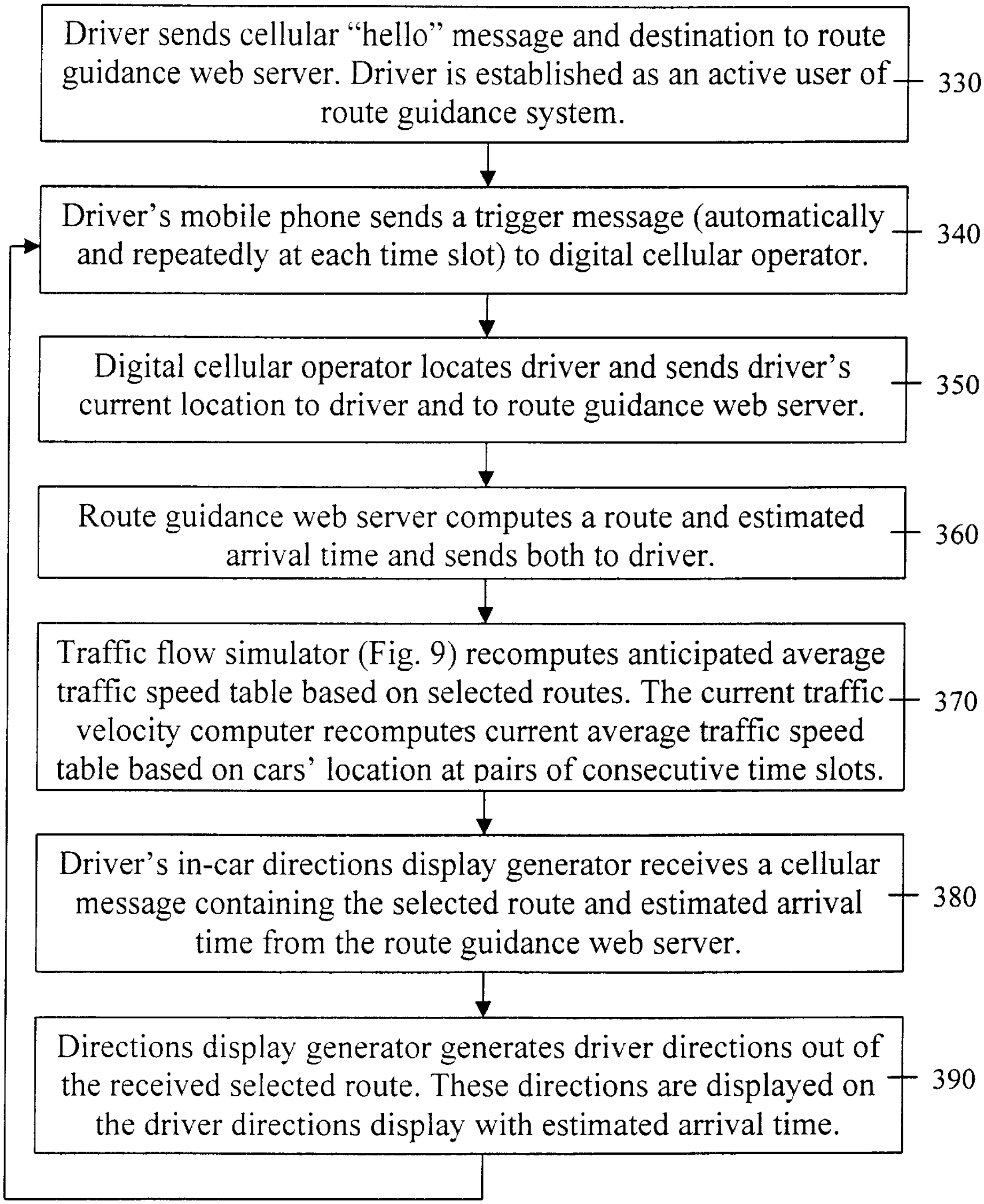
FIG. 6 is a simplified flowchart illustration of an individual driver's interaction with the route guidance system of FIG. 4.

As shown in FIGS. 5–6, periodic computations of anticipated average traffic velocity in each road segment are preferably performed by simulating traffic through the road network, based on selected routes, and periodically "freezing" the traffic picture, typically at two instances in time which are, say, one minute apart, and computing average velocities in each road segment by comparing the locations of the vehicles at the two instances in time.

The size of sample, i.e. proportion of vehicles which are sampled, should be as large as possible, typically restricted only by the digital cellular operator's limitations. For example, in order to carry out a cellular-based computation of a vehicle's location, a signal or a message output by the vehicle's mobile phone is typically provided and thus the limitations of simultaneous message capacity of the actual digital cellular operator are relevant. Similarly, other limitations may exist in embodiments which employ other systems as sources for vehicle location information.

The sampling frequency typically depends on the digital cellular operator's limitations and on the estimated error of vehicles' location. Estimated error depends on the reliability of the source of vehicle location information. This source may, for example, comprise a digital cellular operator, GPS (global positioning system) or any other suitable source. Sampling frequency is typically higher if the vehicle is travelling in the city, relative to a situation in which the vehicle is driving along a freeway.

Any suitable source for vehicle location information may be employed, such as GPS information. In the illustrated embodiment, vehicle location is derived by a digital mobile communication network operator, also termed herein "digital cellular operator", based on messages or signals which are sent by mobile communication devices, such as mobile telephones, mounted on the vehicles.

Typically, messages triggering vehicle location computation, which may even be empty messages, are automatically and repeatedly sent out from any mobile phone served by the system once every time slot. Mobile phones located within vehicles falling within the sample send such automatic cellular messages at least one more time during the time slot in which they were selected for the sample.

Optionally, different subsets of sampled vehicles are more or less frequently sampled. For example, vehicles travelling in town (rather than between towns or cities) may be more frequently sampled because many detour options are available in town such that the vehicle's actual trajectory can only be tracked by frequently sampling the vehicle's location.

Arrow B: Destination is typically input by the user, e.g. by voice or by means of a suitable key-in device on the user's in-car computer. In case the route is not in-car computed, the destination may be sent by the in-car computer to the entity in charge of route computation.

Arrows C and D: An individual driver's route may be selected to minimize the driver's driving time, based on current and anticipated average traffic speeds on candidate roads and road segments. Alternatively, all drivers' routes may be selected to minimize the total drivers' driving time, again based on current and anticipated average traffic speeds on candidate roads and road segments.

Optionally, if two candidate routes are substantially equivalent as to travel time, then route selection involves an unbiased random choice between these two routes.

Optionally, if there is only a slight difference between anticipated travel times over two candidate routes, route selection involves a biased random choice between these two routes, where the weighting of the biased random choice depends on the relationship between the average traffic speeds on the two candidate routes, on the relative lengths of the two candidate routes and also optionally on the absolute lengths of the candidate routes and the rate of flow of traffic speed information to users of the system (which is affected inter alia by the sampling frequency or frequencies employed by the system) and/or the time which elapses until new traffic affects average traffic speed.

More generally, optionally, road characteristics such as width, number of lanes, length, topography, surface quality, traffic regulations and aesthetics are taken into account when determining anticipated average traffic speeds and/or selected routes. Typically, permanent and time-dependent road characteristics are taken into account. Time-dependent road characteristics include, for example, rainy or snowy conditions which affect effective quality of the road and hence average traffic speed. Another example of a time-dependent road characteristic is an accident, construction project or other road obstructing occurrence which is going to affect the traffic for some time. One way to handle time-dependent road characteristics is to define an "anticipated number of lanes" variable which defines as lanes only those lanes which are not blocked by road-obstructing occurrences.

Arrow E: To select a route, the current location of a car is an important input.

Arrow F: Selected routes are preferably sent to the system in order to update anticipated average traffic velocity along each road segment.

Arrow G: The current average traffic velocity in a specific road segment affects the anticipated average traffic velocity in other roads (or road segments) that the specific road segment leads into, directly or ultimately.

Figure 7:
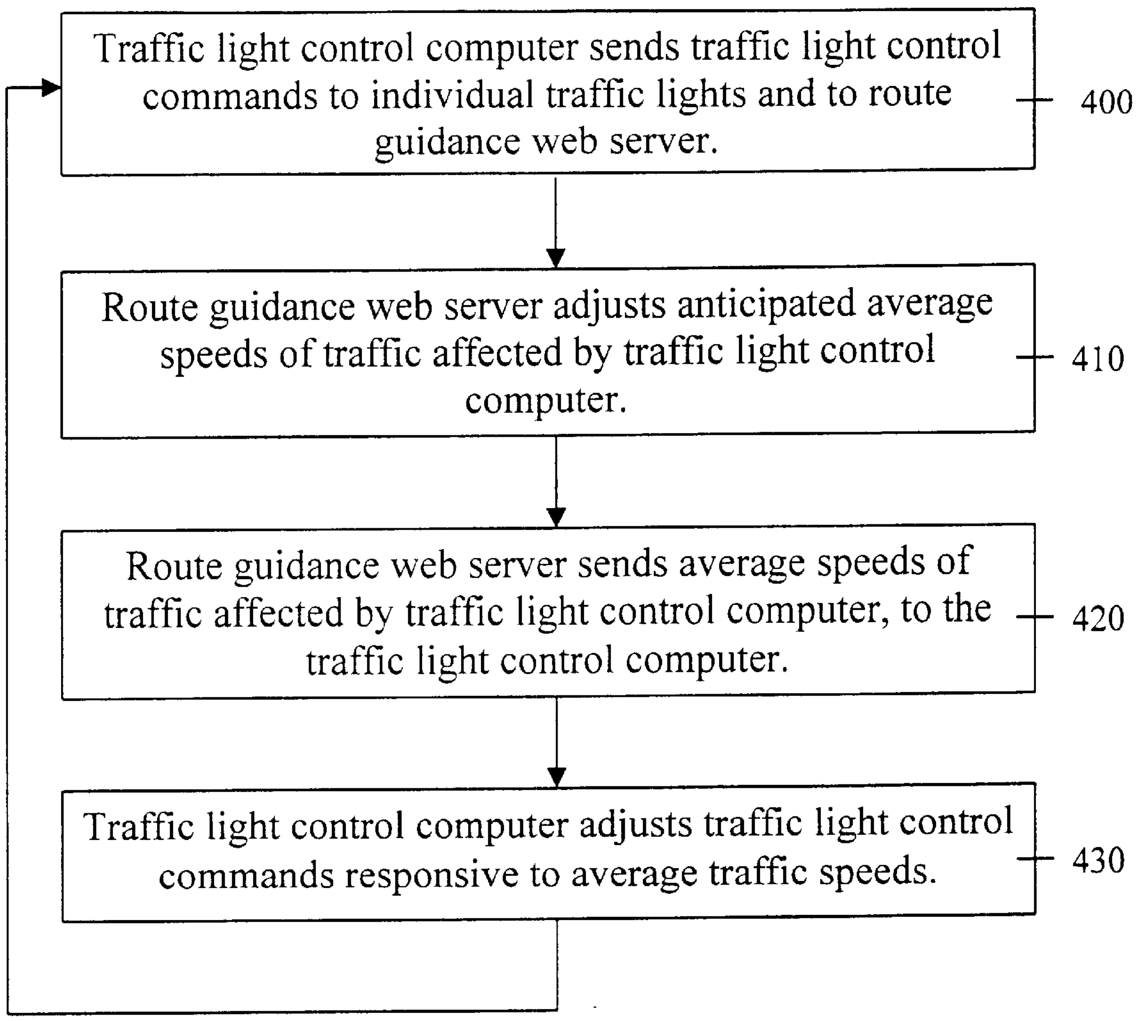
FIG. 7 is a simplified flowchart illustration of an individual traffic light control computer's interaction with the route guidance system of the present invention.

Arrows H, I and J: Typically, the route guidance system of the present invention exchanges data with existing traffic light control systems as shown in FIG. 7. Similarly, the route guidance system of the present invention may exchange data with other computer-controlled systems affecting traffic flow such as ramp traffic control or digital roadside route guidance signs or traffic information signs directing traffic to or away from a certain route, or providing information regarding one or more routes.

Figure 2:
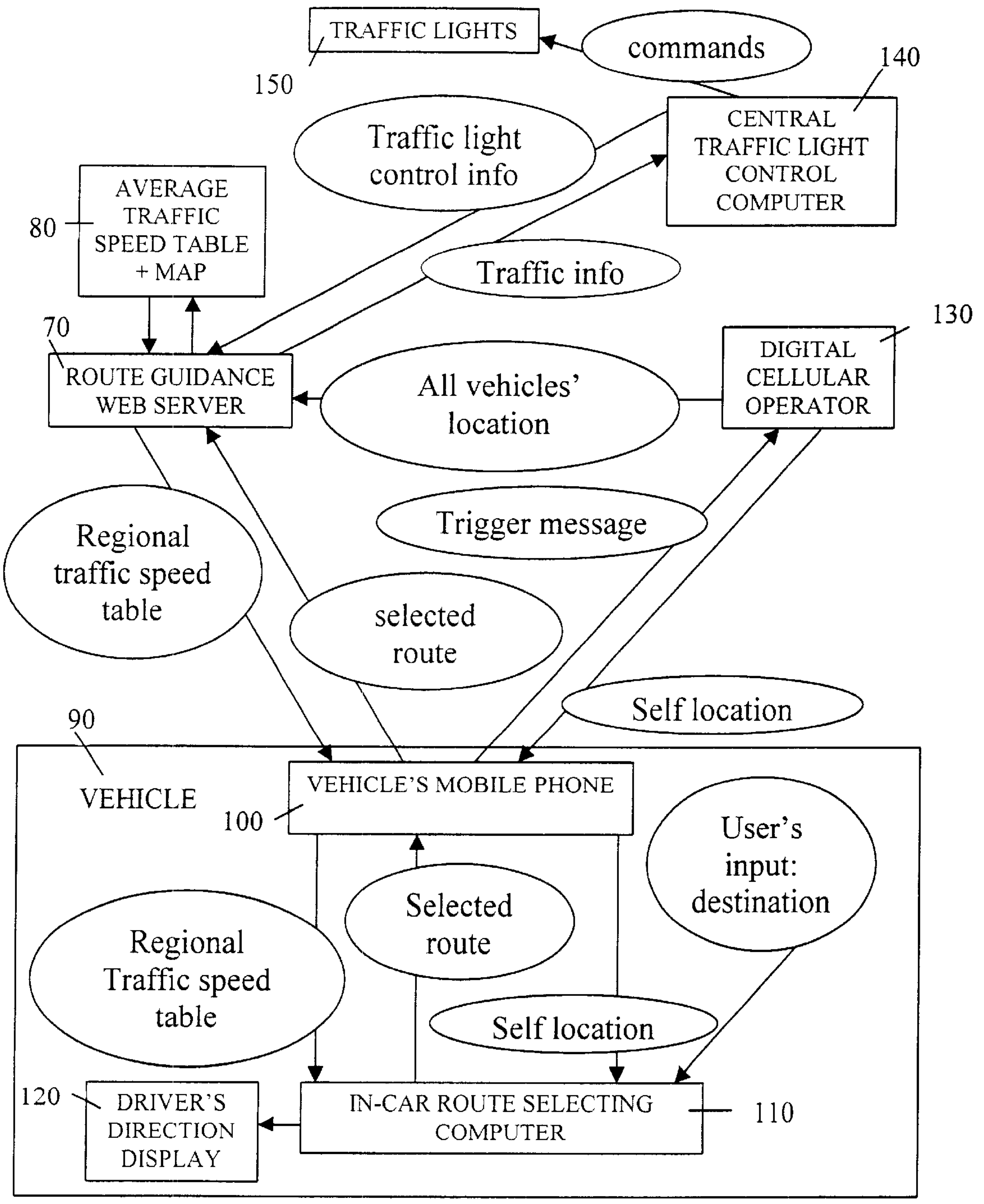
FIG. 2 is a semi-pictorial semi-block diagram illustration of a driving route guidance system implementing the data flow of FIG. 1 and constructed and operative in accordance with a first preferred embodiment of the present invention.

Reference is now made to FIG. 2 which is a semi-pictorial semi-block diagram illustration of a driving route guidance system implementing the data flow of FIG. 1 and constructed and operative in accordance with a first preferred embodiment of the present invention. In FIG. 2, each vehicle computes its own route as well as, preferably, its own estimated arrival time. It is appreciated that the route guidance web server need not necessarily be a web server and may alternatively comprise a non-web server.

Figure 3:
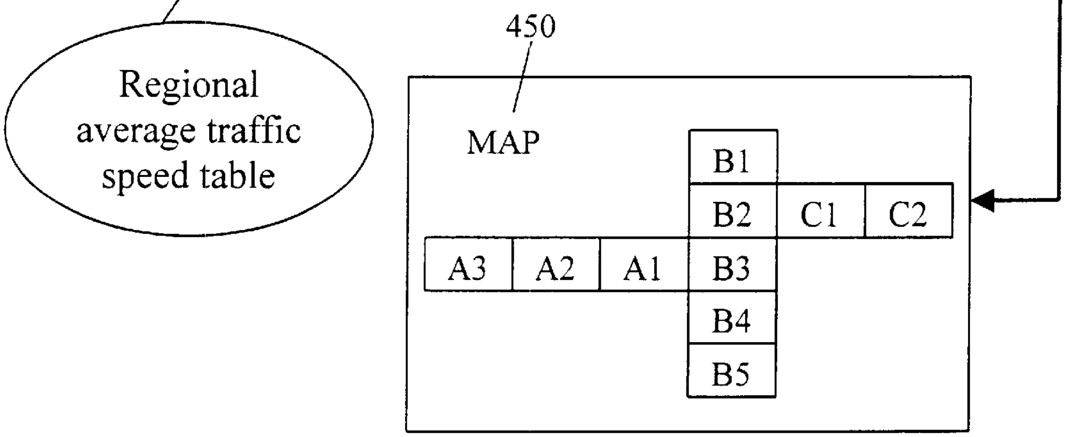
FIG. 3 is a diagrammatic illustration of a preferred implementation of the average traffic speed table+map of FIG. 2.

Reference is now made to FIG. 3 which is a diagrammatic illustration of a preferred implementation of the average traffic speed table+map of FIG. 2. The map of FIG. 3 may be stored in any suitable format or representation such as a graph representation or such as a bitmap. The map preferably includes detailed information regarding each road and each segment of each road typically including some or all of the following information: road width, length, number of lanes, topography, surface quality.

Figure 9:
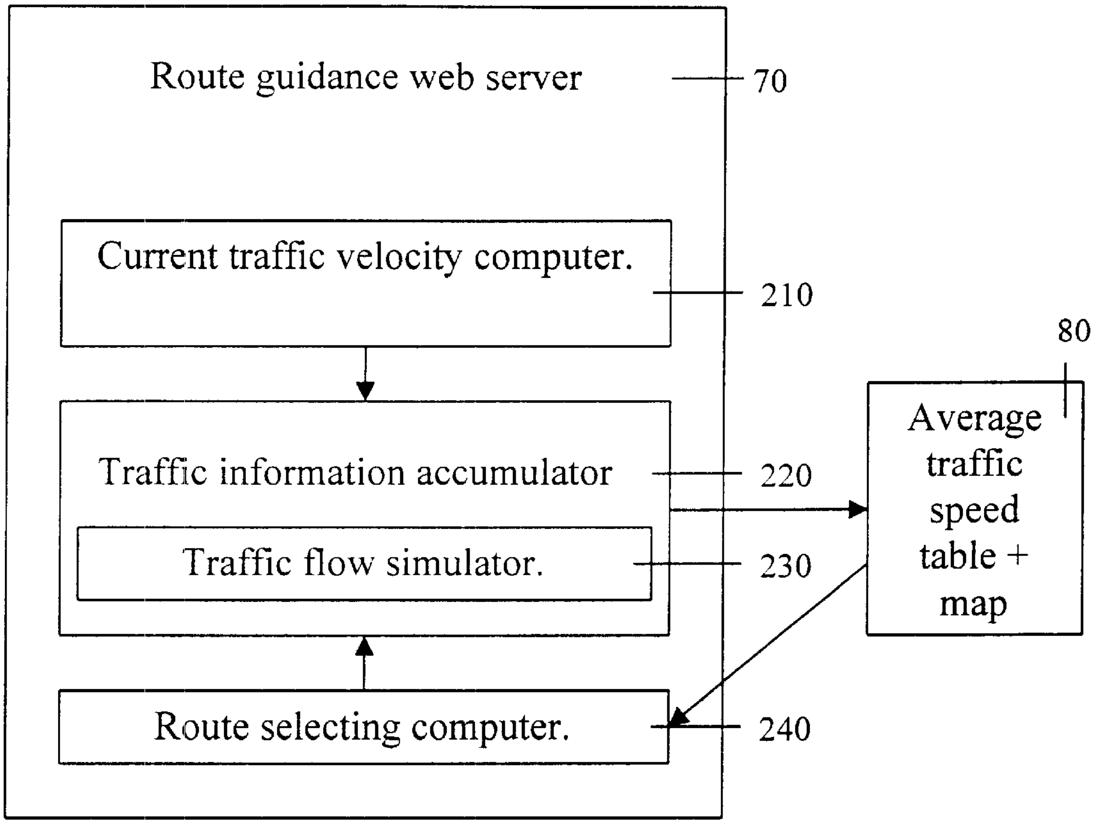
FIG. 9 is a simplified functional block diagram illustration of the route guidance server of FIG. 4, constructed and operative in accordance with a preferred embodiment of the present invention.

The traffic flow simulator of FIG. 9 employs the map of FIG. 3 when computing the anticipated average traffic velocity in each road and each segment of each road.

Any desired regional traffic speed table may be sent to a vehicle from the average traffic speed table by selecting the contents of the table which pertain to a particular region in which the vehicle is travelling, the region comprising certain roads each of which includes one or more segments.

If communication with vehicles is cellular and if the cellular communication system provides a cell-based message broadcasting capability, supported e.g. by a short message system (SMS)), then the network of roads, and hence the table, are preferably divided into regions which correspond to the cells. Thereby, the same regional table or tables may be broadcast to all vehicles within a particular cell, which reduces the communication burden. Typically, more than one regional table is broadcast to vehicles within a particular cell. Specifically, the regional tables of that cell and all its cell neighbors may be broadcast to the vehicles within the cell, in order to anticipate a situation in which a vehicle crosses from cell to cell.

Figure 4:
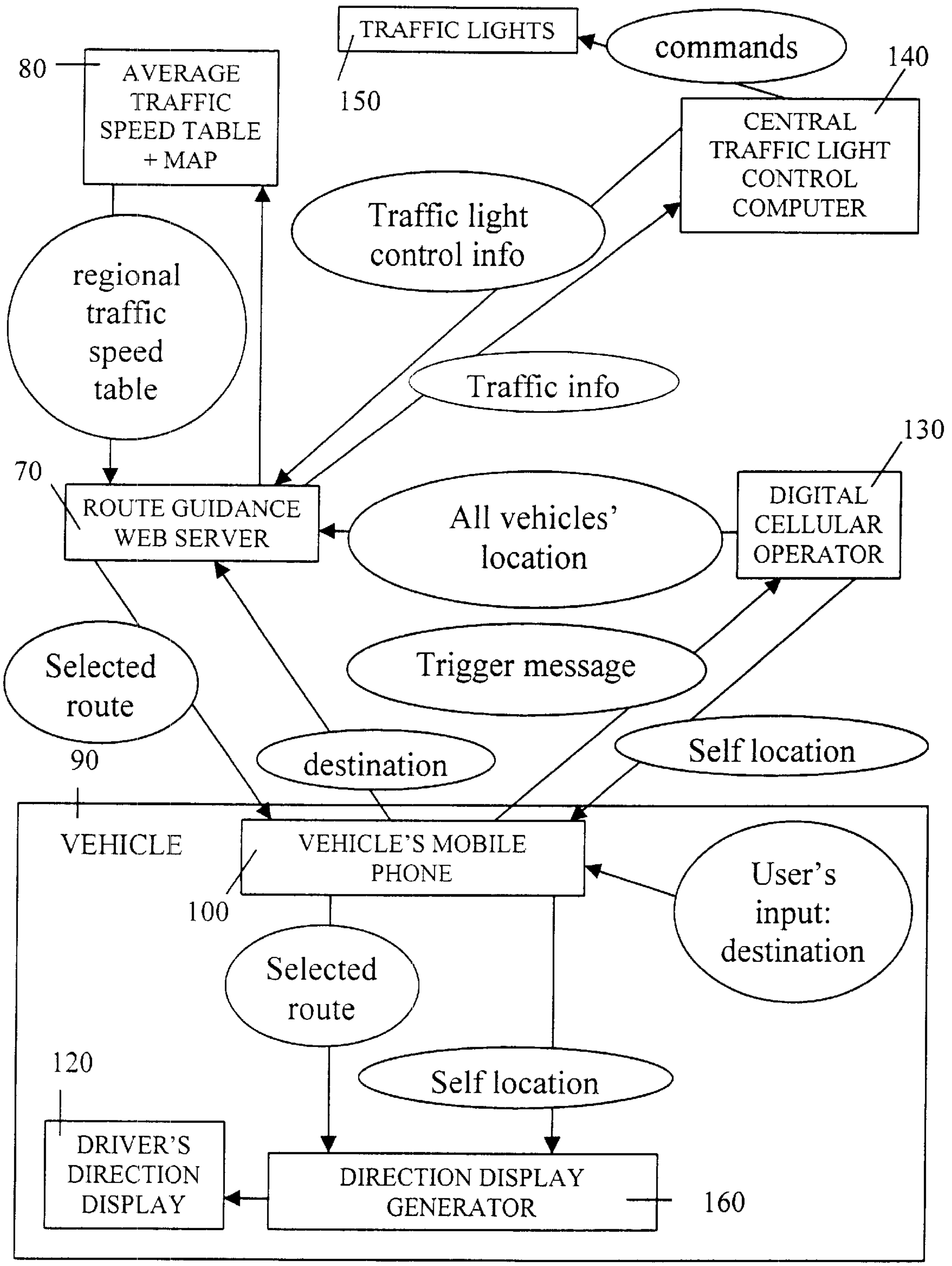
FIG. 4 is a semi-pictorial semi-block diagram illustration of a driving route guidance system implementing the data flow of FIG. 1 and constructed and operative in accordance with a second preferred embodiment of the present invention.

Reference is now made to FIG. 4 which is a semi-pictorial semi-block diagram illustration of a driving route guidance system implementing the data flow of FIG. 1 and constructed and operative in accordance with a second preferred embodiment of the present invention. In FIG. 4, the server computes routes and, optionally, estimated arrival times, rather than each vehicle doing so as in FIG. 2.

Reference is now made to FIG. 5 which is a self-explanatory simplified flowchart illustration of an individual driver's interaction with the route guidance system of FIG. 2. As shown, the in-car computer typically does not receive the entire average traffic speed table but only a subset thereof pertaining to territory which the vehicle may wish to traverse. The size of the region is typically selected to be large enough such that all information pertaining to the contemplated trip is transmitted to the in-car computer by the route guidance server.

FIG. 6 is a simplified flowchart illustration of an individual driver's interaction with the route guidance system of FIG. 4.

Reference is now made to FIG. 7 which is a self-explanatory simplified flowchart illustration of an individual traffic light control computer's interaction with the route guidance system of the present invention.

Figure 8:
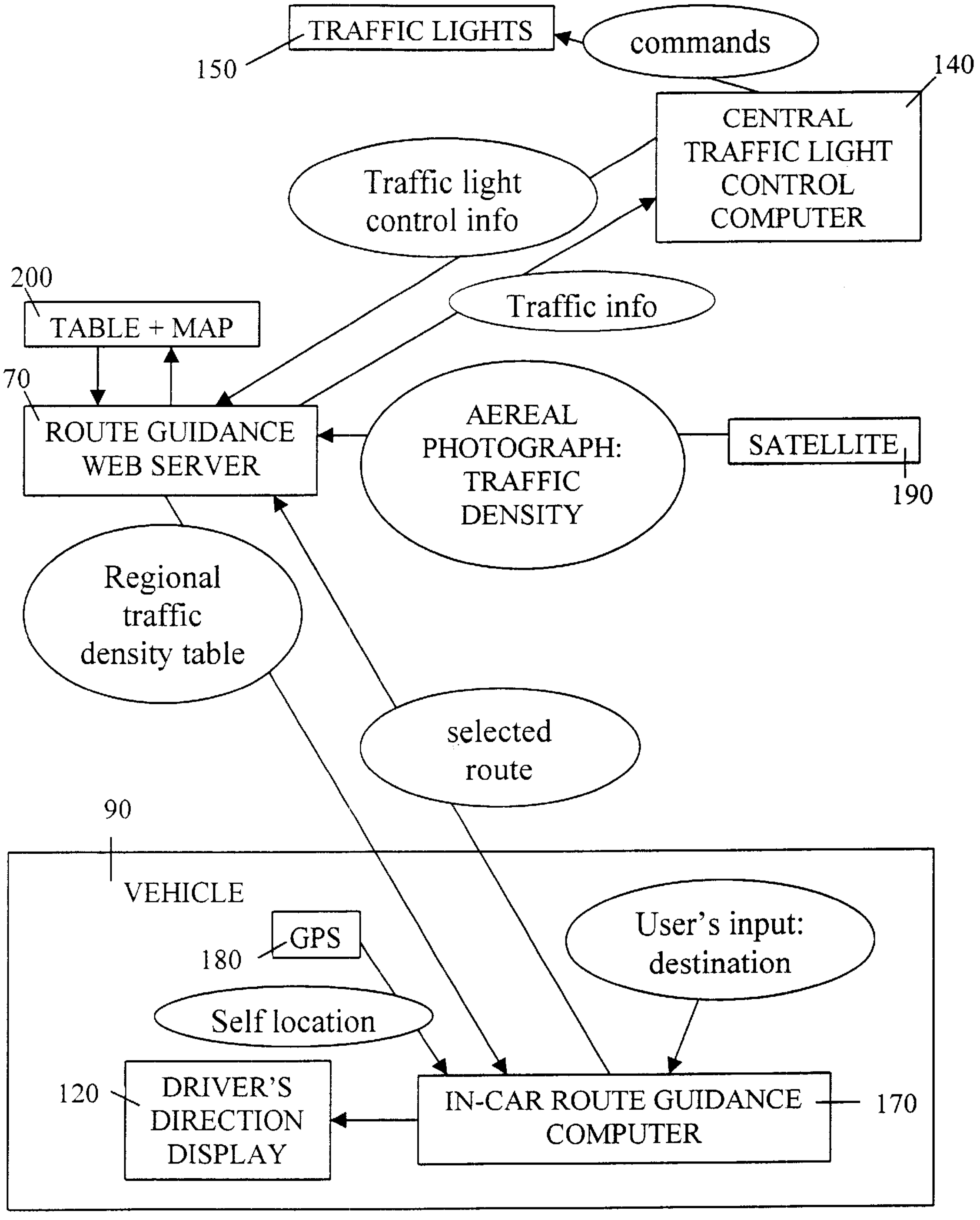
FIG. 8 is a simplified semi-pictorial semi-block diagram illustration of a route guidance system constructed and operative in accordance with a preferred embodiment of the present invention which employs aerial photographs to derive traffic information such as traffic density information, the system communicating with vehicles via satellite.

FIG. 8 is a simplified semi-pictorial semi-block diagram illustration of a route guidance system constructed and operative in accordance with a preferred embodiment of the present invention which employs aerial photographs to derive traffic information such as traffic density information, the system communicating with vehicles via satellite.

The embodiment of FIG. 8 differs from the embodiment of FIGS. 2 and 4 in that:

a. The source of traffic information is aerial photographs rather than or in addition to ground-based and/or vehicle originated sources;

b. The type of traffic information comprises traffic density information rather than or in addition to velocity information, and c. Communication of the central system with the vehicles is via satellite rather than or in addition to cellular communication.

It is appreciated that any of the features of FIG. 8 may be incorporated in isolation or in combination with any other feature into the embodiments of either FIG. 2 or FIG. 4.

FIG. 9 is a simplified functional block diagram illustration of the route guidance server of FIG. 4, constructed and operative in accordance with a preferred embodiment of the present invention. The route guidance server of FIG. 2 may be similar except that the route selection unit is eliminated since route selection is performed by the in-car computer of the individual vehicles.

Another application of the present invention pertains to tollway systems. Based on the locations of all vehicles for which localization is possible (e.g. digital cellular operator's users, vehicles equipped with GPS (global positioning system) etc.) a tollway system may be provided with all necessary information regarding the tollway segments travelled by each car. Therefore all existing toll debit means (e.g. toll gates, tollcards, electronic toll wallet etc.) may be replaced by a system that periodically, e.g. monthly, computes an exact total debit for each vehicle, based upon information listing all toll way segments that the vehicle has passed during the time period in question.

Still another application of the present invention pertains to fleet management systems. Based on the location, provided by any suitable vehicle location source, of all vehicles belonging to a fleet, a fleet management system is able to compute the individual average velocity of any car that belongs to the fleet during any time period. Also, the system of the present invention is capable of providing traffic information which would allow a fleet manager to select a vehicle, from among several vacant vehicles in the fleet, which can most quickly arrive at a particular destination, such as the current location of a passenger who has ordered a taxi. Typically, the vacant vehicle to send to a particular destination is selected by selecting, from among the vacant vehicles in the fleet, the one having the shortest estimated arrival time to the destination in question.

It is appreciated that the software components of the present invention may, if desired, be implemented in ROM (readonly memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A route guidance system, for providing individualized route guidance to from at least one and up to each one of a plurality of selected individual vehicles, which are system participants, and which are moving in at least one traffic stream of a plurality of vehicles, the route guidance system comprising:

a.) a traffic velocity computer:

i.) for receiving and storing at least one item of information from up to each one of the at least one selected vehicle, the at least one item of information being selected from the group consisting of:

starting location information, including the starting position, for each one of the at least one selected vehicle to which route guidance is to be provided;

destination location information, including the destination position, for each one of the at least one selected vehicle to which route guidance is to be provided;

a plurality of pieces of intermediate location information for each one of the at least one selected vehicle to which route guidance is to be provided, with each piece of intermediate location information relating to a different intermediate position of the selected vehicle that is between the selected vehicle's stating position and its destination position, each piece of intermediate location information being measured at a different known time, and such that pairs of pieces of location information are utilized to determine segments of a recommended route of travel for each vehicle to which route guidance is to be provided, with each pair of pieces of information being selected from the group consisting of: information relating to two of the plurality of intermediate vehicle positions for each selected vehicle, the staring position and one intermediate position for each selected vehicle, and one intermediate position and the destination position for each selected vehicle, and with each pair of pieces of location information having a predetermined time interval for travel therebetween at a measured vehicle velocity for the selected vehicle; and a predetermined route, between a selected vehicle's starting location and its destination location, assigned to each of the at least one selected vehicle to which route guidance is to be provided; and ii.) for computing and storing at least one velocity characteristic of the traffic stream in which a particular vehicle to which route guidance is to be provided is moving;

b.) a route selecting computer:

i.) for receiving and storing destination location information from each of the at least one selected vehicle moving in the at least one traffic stream and a current location information from each of the at least one selected vehicle, moving in the traffic stream; and ii.) for computing a route for each selected vehicle moving in the at least one traffic stream, to which route guidance is to be provided, the route being composed of a plurality of route segments, such that each route segment is determined between a vehicle's current location and that vehicle's destination, the route being computed at least partly as a function of the at least one velocity characteristic of the traffic stream;

c.) at least one vehicle information transmitting means, such that there is a vehicle information transmitting means located in each one of the at least one selected vehicle moving in the traffic stream, the at least one vehicle information transmitting means being for transmitting at least one item of information about the vehicle in which that vehicle information transmitting means is located to at least one of the traffic velocity computer and the route selecting computer; and d.) at least one vehicle on-board computer, located in each of the at least one selected vehicle moving in the traffic stream, for receiving and storing route information for that vehicle from the route selecting computer.

2. The system according to claim 1, wherein at least one of the plurality of locations is computed by a digital cellular operator.

3. The system according to claim 1, wherein at least one of the plurality of locations is GPS information.

4. The system according to claim 1, wherein the route selecting computer is operative to receive the moving vehicle's current location from a digital cellular operator.

5. The system according to claim 1, wherein the route selecting computer takes into account at least one road characteristic affecting average traffic speed.

6. The system according to claim 5, wherein the road characteristic is a time-dependent road characteristic.

7. The system according to claim 5, wherein the road characteristic is a permanent road characteristic.

8. A traffic velocity monitoring system, for monitoring the average velocity of a moving stream of vehicular traffic, the system comprising:

a.) means for representing a geographical area in which at least one moving vehicular traffic stream travels;

b.) a vehicle location monitor for receiving vehicle location information, from a plurality of selected vehicles moving in the at least one vehicular traffic stream, the vehicle location information including at least information relating to a current location of at least one of the selected vehicles; and c.) a vehicle velocity computer, for storing vehicle location information received by and from the vehicle location monitor, and for determining an average velocity of at least one of the selected plurality of vehicles moving in the at least one vehicular traffic stream; and d.) at least one vehicle location information transmitting means, located in each one of the at least one selected vehicle moving in the at least one vehicular traffic stream, for transmitting at least one item of vehicle location information about the vehicle in which that vehicle information location transmitting means is located to the vehicle location monitor.

9. The system according to claim 8, further comprising a global velocity computer for storing an average velocity determined for each of the plurality of selected vehicles moving in the at least one vehicular traffic stream, received from the vehicle velocity computer, for computing therefrom an average velocity of traffic for each of the at least one vehicular traffic stream.

10. A route guidance system, for providing individualized route guidance to each one of at least one selected individual vehicle moving in a traffic stream of a plurality of vehicles, the route guidance system comprising:

a.) a traffic information computer for receiving and storing current information about the traffic stream, including a staring location of each of at least one selected vehicle moving in the traffic stream, a destination location of each of the at least one vehicle moving in the traffic stream, and a revisable and updatable predetermined route between the current location and the destination location of each of the at least one selected vehicle moving in the traffic stream, which route is assigned to each of the at least one vehicle moving in the traffic stream at a specified point in time, and for performing computations involving the information about the traffic stream;

b.) a route selecting computer for computing a route for each selected vehicle in the traffic stream, the route being between the current location of each vehicle moving in the traffic stream and the destination location of that vehicle, with the route being determined at least partly as a function of the information about the traffic stream;

c.) at least one vehicle information transmitting means, such that there is a vehicle information transmitting means located in each one of the at least one selected vehicle moving in the traffic stream, the at least one vehicle information transmitting means being for transmitting at least one item of information about the vehicle in which that vehicle information transmitting means is located to the traffic information accumulator, the at least one item of information about the vehicle in which that vehicle information transmitting means is located being selected from the group consisting of: a starting location of that vehicle; a destination location of that vehicle; and a current position of that vehicle at a specified point in time; and d.) at least one vehicle on-board computer, located in each of the at least one selected vehicle moving in the traffic stream, for receiving and storing route information for that vehicle from the route selecting computer.

11. The system according to claim 10, wherein the route computed by the route selecting computer is fed back to the traffic information computer and is utilized by the traffic information computer to generate estimated information about the traffic stream for a period of time during which at least one vehicle in the traffic stream moves between a future location and its final destination location.

12. The system according to claim 11, further comprising a dynamic route selecting computer for providing each of the at least one vehicle moving in the traffic stream with a modification of that vehicle's route, the modification of that vehicle's route being made at least partly as a function of the estimated information about the traffic stream generated by the traffic information computer.

13. The system according to claim 11, wherein the traffic information computer includes a traffic flow simulator for generating at least some of the estimated information about the traffic stream.

14. The system according to claim 10, wherein the route selecting computer randomly selects at least a portion of a route for at least one selected vehicle moving in at least one traffic stream, such that the portion of the route is selected from among a plurality of alternative route portions for that portion of the route for that vehicle, with the random selection being biased by predetermined relative merits of each alternative route portion for that vehicle.

15. The system according to claim 10, wherein the traffic information computer also receives current information relating to road conditions in road segments between a vehicle's current location and that vehicle's selected destination location.

16. The system according to claim 15, wherein the road conditions include permanent road conditions.

17. The system according to claim 15, wherein the road conditions include transient road conditions.

18. The system according to claim 17, wherein the transient road conditions include current conditions of multi-condition-capable traffic regulating elements.

19. The system according to claim 18, wherein the multi-condition-capable traffic governing elements include at least one elements selected from the group consisting of:

a traffic light capable of being programmed according to a plurality of possible schedules; and a digital sign displaying any of a plurality of route-guiding messages.

20. The system according to claim 18, wherein the traffic information computer provides information to the multi-condition-capable traffic governing elements and the multi-condition-capable traffic governing elements select a condition at least partly in response to the information provided thereto.

21. The system according to claim 10, wherein the information about the traffic stream includes quantitative information.

22. The system according to claim 10, wherein the route selecting computer includes a plurality of independent route selecting units, with each one of the plurality of independent route selecting units being located in a respective one of a corresponding plurality of vehicles.

23. The system according to claim 10, wherein the route selecting computer includes a central unit for computing a route for each one of a plurality of vehicles and for transmitting the computed route for each respective vehicle to that vehicle.

24. The system according to claim 10, wherein the route selecting computer computes and displays an estimated arrival time for the at least one selected individual vehicle moving in a traffic stream of a plurality of vehicles.

25. The system according to claim 10, further comprising a route display unit for displaying at least one driver direction derived from the route to a driver of the at least one vehicle moving in a traffic stream of a plurality of vehicles.

26. The system according to claim 10, wherein the traffic characterizing information employed by the route selecting computer includes information regarding anticipated traffic.

27. A route guidance system, for providing individualized route guidance to each one of selected individual vehicles moving in a traffic stream of a plurality of vehicles, the route guidance system comprising:

a.) a traffic velocity computer:

i.) for receiving and storing at least one piece of information selected from the group consisting of: a plurality of locations, separated by a known time interval, of at least one vehicle within traffic separating the moving vehicle's current location from said selected destination; and ii.) for computing at least one velocity characteristic of the traffic; and b.) a route selecting computer:

i.) for receiving a selected destination of a moving vehicle and a current location of the moving vehicle, and ii.) for computing a route from the moving vehicle's current location to the moving vehicle's selected destination at least partly as a function of said at least one velocity characteristic.

28. A route guidance method, for providing individualized route guidance to each one of at least one selected individual vehicle moving in at least one traffic stream of a plurality of vehicles, the route guidance method comprising the steps of:

a.) providing a computer having information storage and computational capabilities, i.) for receiving at least one piece of information selected from the group consisting of:

a selected destination of at least one moving vehicle, a current location of each of the at least one moving vehicle, and a plurality of intermediate locations, separated by a known time interval, of at least one vehicle within a traffic stream, such that each intermediate location is between the at least one moving vehicle's current location and its selected destination, and a route assigned to at least one vehicle in the at least one traffic stream; and ii.) for computing at least one velocity characteristic of the at least one traffic stream;

b.) having the computer receive the at least one selected piece of information from at least one vehicle moving in the at least one traffic stream through information transmitting means located in the vehicle;

c.) computing a at least one revised route segment for each of the at least one vehicle moving in the at least one traffic stream, the at least one revised route segment being determined from the at least one moving vehicle's current location to that vehicle's selected destination, computation of the at least one revised route segment being made at least partly as a function of the at least one velocity characteristic of the traffic stream.

29. A method for computing an average velocity of at least one stream of vehicular traffic, the method comprising the steps of:

a.) providing means for representing a geographical area in which at least one moving vehicular traffic stream travels, together with means for identifying locations on the geographical representation of the area and means for determining distances between locations on the geographical representation;

b.) providing a vehicle location monitor for receiving vehicle location information from a plurality of selected vehicles moving in the at least one vehicular traffic stream, the vehicle location information including at least information relating to a current location of at least one of the selected vehicles at a specified point in time, measured at successive points in time;

c.) transmitting information relating to the current locations of a plurality of moving vehicles; from a each one of the plurality of moving vehicles to the vehicle location monitor, at successive points in time; and d.) calculating an average velocity of at least one moving vehicular traffic stream from successive transmissions of current location information from at least one moving vehicle in each vehicular traffic stream, by first calculating a velocity for each vehicle in the traffic stream.

30. The method according to claim 29, further comprising the step of:

utilizing a global average velocity of a sample of moving vehicles to estimate average velocity of traffic.

31. A route guidance method, for providing individualized route guidance to each one of at least one selected individual vehicle moving in at least one traffic stream of a plurality of vehicles, the route guidance method comprising the steps of:

a.) accumulating up-to-date information characterizing traffic including a route assigned to at least one vehicle within said traffic; and b.) computing a route from a moving vehicle's current location to the moving vehicle's selected destination, at least partly as a function of said traffic characterizing information.

32. A route guidance method, for providing individualized route guidance to each one of at least one selected individual vehicle moving in at least one traffic stream of a plurality of vehicles, the route guidance method comprising the steps of:

a.) providing at least the following information:

i.) a selected destination of at least one moving vehicle, ii.) a current location of the at least one moving vehicle, and iii.) a plurality of pairs of locations, separated by a known time interval, at a known travel velocity of the at least one moving vehicle in the traffic stream, such that each pair of locations includes the moving vehicle's current location and the moving vehicle's selected destination;

b.) computing at least one velocity characteristic of the traffic stream; and c.) computing a route for the at least one moving vehicle from the moving vehicle's current location to the moving vehicle's selected destination, the route being computed at least partly as a function of the at least one computed velocity characteristic.

33. A route guidance system, for providing individualized route guidance to each one of at least one selected individual vehicle moving in at least one traffic stream of a plurality of vehicles, the route guidance system comprising:

a.) a traffic quantifier:

i.) for receiving and storing at least the following information:

traffic location information describing pairs of locations of at least one vehicle in the at least one traffic stream, each pair of locations including the current location of the moving vehicle at a point in time and the selected destination location for that vehicle, and a route assigned to at least one moving vehicle in the traffic stream, and ii.) for computing at least one quantitative characteristic of the traffic stream; and b.) a route selecting computer:

i.) for receiving and storing a selected destination location for the at least one moving vehicle and a current location of the at least one moving vehicle, and ii.) for computing a route from the at least one moving vehicle's current location to the at least one moving vehicle's selected destination, the route being computed at least partly as a function of the at least one quantitative characteristic of the traffic stream.

34. A route guidance method, for providing individualized route guidance to each one of at least one selected individual vehicle moving in at least one traffic stream of a plurality of vehicles, the route guidance method comprising the steps of:

a.) providing information storage and retrieval means for receiving, storing, and retrieving at least the following information:

i.) a selected destination of the at least one moving vehicle in the at least one traffic stream, ii.) a current location of the at least one moving vehicle in the at least one traffic stream, and iii.) a route assigned to the at least one moving vehicle in the traffic stream;

b.) providing computational means for computing at least one quantitative characteristic of the traffic stream; and c.) computing a route for the at least one vehicle from the moving vehicle's current location to the moving vehicle's selected destination, at least partly as a function of the at least one quantitative characteristic.

35. A route guidance system, for providing individualized route guidance to each one of at least one selected individual vehicle moving in at least one traffic stream of a plurality of vehicles, the route guidance system comprising:

a.) a traffic quantification computer for providing a quantitative characteaon of traffic separating the moving vehicle's current location from the selected destination; and b.) a route selecting computer for receiving and storing a selected destination of a moving vehicle and a current location of the moving vehicle, and for computing a route segment extending from the moving vehicle's current location to the moving vehicle's selected destination, the route segment being computed at least partly as a function of the quantitative characterization.

36. A method for monitoring a population of users bearing mobile communication devices, the method comprising:

receiving information from a user bearing a mobile communication device which is indicative of his destination; and accumulating the information and providing the information to at least one element serving the population of users.

37. The method according to claim 36, wherein the user bearing a mobile communication device is a vehicle bearing a mobile communication device.

38. A vehicle route guidance system comprising:

a.) a route guidance web server:

i.) for receiving and storing information, including at least a destination location for at least one vehicle that participates in the system, the information being received from at least one of a plurality of vehicles moving in at least one traffic stream of vehicles;

ii.) for providing vehicle location information for at least two consecutive locations of a vehicle to an average traffic speed table and position location map information storage means and computer;

iii.) for computing certain general traffic parameters and certain individual vehicle route data from the received information;

iv.) for receiving and storing traffic light control information from a central traffic light control computer;

v.) for receiving and storing traffic speed information from the average traffic speed table and position location map information storage means and computer;

vi.) for computing and storing individual route information for a particular vehicle; and vii.) for transmitting the computed individual vehicle route information for a vehicle to that vehicle;

b.) a digital cellular operator:

i.) for receiving, storing and transmitting information, including for receiving a trigger message from each of a plurality of vehicle mobile information transmitting/receiving units in individual vehicles that participate in the system, in response to which information about the location of each individual vehicle that has transmitted a trigger message to the digital cellular operator is computed and is transmitted back to each such vehicle; and ii.) for transmitting stored information regarding the location of each vehicle that participates in the system at at least one given point in time, to the route guidance web server;

c.) a central traffic light control computer:

i.) for receiving and storing traffic information from the route guidance web server;

ii.) for providing traffic light control information to the route guidance web server; and iii.) for providing command signals to from at least one and up to a plurality of traffic lights;

d.) means for storing information about an average traffic speed table and a position location map, for receiving and storing vehicle position information from the route guidance web server; and e.) a vehicle on-board sub-system in each of at least one vehicle that participates in the system, the vehicle on-board sub-system including:

i.) a vehicle mobile information transmitting and receiving unit:

for receiving user input destination location information for that vehicle;

for transmitting the trigger message to the digital cellular operator;

for receiving vehicle location information about that vehicle's location from the digital cellular operator;

for transmitting destination location information about that vehicle's destination to the route guidance web server;

for receiving the computed route information for that vehicle from the route guidance web server;

for providing information about that vehicle's location at a given point in time and the computed route information to a vehicle on-board direction display generator;

ii.) a vehicle on-board direction display generator:

for receiving vehicle location information and computed route information from that vehicle's on-board mobile information transmitting and receiving unit; and for transmitting the vehicle location information and computed route information to a vehicle on-board driver direction display unit; and iii.) a vehicle on-board driver direction display unit:

for receiving vehicle location information and computed route information for that vehicle from the direction display generator; and for displaying that information to a driver of that vehicle.

39. The vehicle route guidance system according to claim 38, wherein the vehicle on-board mobile information transmitting and receiving unit is a cellular telephone.

40. The vehicle route guidance system according to claim 38, further comprising:

f.) at least one reconnaissance satellite in outer space:
   i.) for obtaining aerial photographic image data of at least one vehicular traffic stream; and
   ii.) for transmitting the aerial photographic image data of the at least one vehicular traffic stream from outer space to the route guidance web server; and e.iv) a vehicle on-board global positioning system (GPS) that is part of the vehicle on-board sub-system, for providing current vehicle location information about that vehicle to the vehicle on-board route guidance computer; and such that the route guidance web server computes values of a regional traffic density table, which it provides to the vehicle on-board route guidance computer.

41. A vehicle route guidance system comprising:

a.) a route guidance web server:
   i.) for receiving and storing information, including at least a selected route for at least one vehicle that participates in the system, the information being received from at least one of a plurality of vehicles moving in at least one traffic stream of vehicles;
   ii.) for providing vehicle location information for at least two consecutive locations of a vehicle to an average traffic speed table and position location map information storage means and computer;
   iii.) for computing certain general traffic parameters and certain individual vehicle route data from the received information;
   iv.) for receiving and storing traffic light control information from a central traffic light control computer;
   v.) for receiving and storing traffic speed information from the average traffic speed table and position location map information storage means and computer, for use in developing values for a regional traffic speed table, the values of which are, in turn, provided to a particular vehicle; and b.) a digital cellular operator:
   i.) for receiving, storing and transmitting information, including for receiving a trigger message from each of a plurality of vehicle mobile information transmitting/receiving units in individual vehicles that participate in the system, in response to which information about the location of each individual vehicle that has transmitted a trigger message to the digital cellular operator is computed and is transmitted back to each such vehicle; and
   ii.) for transmitting stored information regarding the location of each vehicle that participates in the system at at least one given point in time, to the route guidance web server;

c.) a central traffic light control computer:
   i.) for receiving and storing traffic information from the route guidance web server;
   ii.) for providing traffic light control information to the route guidance web server; and
   iii.) for providing command signals to from at least one and up to a plurality of traffic lights;

d.) information storage means for storing information, including values for an average traffic speed table and a position location map, and for receiving and storing vehicle position information from the route guidance web server;

e.) a vehicle on-board sub-system in each of at least one vehicle that participates in the system, the vehicle on-board sub-system including:
   i.) a vehicle on-board mobile information transmitting and receiving unit:
      for transmitting the trigger message to the digital cellular operator;
      for receiving vehicle location information about that vehicle's location from the digital cellular operator;
      for receiving selected route information about that vehicle's route from a vehicle on-board route selecting computer;
      for transmitting the selected route information about that vehicle's route to the route guidance web server;
      for receiving regional traffic speed values for that vehicle from the route guidance web server;
      for providing those regional traffic speed values for that vehicle to a vehicle on-board route selecting computer;
      for providing information about that vehicle's location at a given point in time to the vehicle on-board route selecting computer
   ii.) a vehicle on-board route selecting computer:
      for receiving user input destination location information for that vehicle;
      for receiving vehicle location information and computed route information from that vehicle's on-board mobile information transmitting and receiving unit;
      for receiving regional traffic speed values for that vehicle from that vehicle's on-board mobile information transmitting and receiving unit; and
      for transmitting the computed route information for that vehicle to a vehicle on-board driver direction display unit; and
   iii.) a vehicle on-board driver direction display unit:
      for receiving computed route information for that vehicle from the direction display generator; and
      for displaying that information to a driver of that vehicle.

42. The vehicle route guidance system according to claim 41, wherein the vehicle on-board mobile information transmitting and receiving unit is a cellular telephone.

43. The vehicle route guidance system according to claim 41, further comprising:

f.) at least one reconnaissance satellite in outer space:
   i.) for obtaining aerial photographic image data of at least one vehicular traffic stream; showing traffic density, and
   ii.) for transmitting the aerial photographic image data of the at least one vehicular traffic stream from outer space to the route guidance web server; and e.iv) a vehicle on-board global positioning system (GPS) that is part of the vehicle on-board sub-system, for providing current vehicle location information about that vehicle to the vehicle on-board direction display generator; and such that the route guidance web server computes values of a regional traffic density table, which it provides to the vehicle on-board direction display generator.

44. A method for providing route guidance to a vehicle comprising the steps of:

a.) providing a route guidance system including a vehicle on-board route guidance system in each of at least one vehicle to which route guidance is to be provided, the vehicle on-board route guidance system including at least a vehicle on-board mobile information transmitting and receiving unit, a vehicle on-board directions generator, and a vehicle on-board directions display unit; and the route guidance system further including a base system including at least a route guidance web server, a digital cellular operator, a traffic flow simulator, and a traffic current velocity computer;

b.) transmitting a recognition message from the vehicle on-board mobile information transmitting and receiving unit to the route guidance web server to establish the transmitting vehicle as an active user of the route guidance system;

c.) utilizing the vehicle on-board mobile information transmitting and receiving unit to input and transmit desired destination location information for at least one particular vehicle into the route guidance web server;

d.) utilizing the vehicle on-board mobile information transmitting and receiving unit to periodically transmit, at selected time periods having a predetermined time interval and frequency, a trigger message to the digital cellular operator;

e.) utilizing the digital cellular operator to locate a current position of a vehicle and to send a vehicle's current position location information to the vehicle on-board mobile information transmitting and receiving unit and to the route guidance web server;

f.) utilizing the route guidance web server to compute a route and an estimated arrival time, and to transmit the computed route and estimated arrival time to the vehicle on-board mobile information transmitting and receiving unit;

g.) utilizing the traffic flow simulator to recompute values for an anticipated average traffic speed table, based on the selected route;

h.) utilizing the current traffic velocity computer to recompute values for the current average traffic speed table based on the measurements of a vehicle's location at pairs of consecutive time periods at which vehicle location is measured;

i.) utilizing the route guidance web server to transmit information, including a selected route and an estimated arrival time, to the vehicle on-board directions generator;

j.) utilizing the vehicle on-board directions generator to generate a set of vehicle directions from the selected route information; and k.) transmitting the set of vehicle directions generated by the vehicle on-board directions generator, together with an estimated arrival time, to the vehicle on-board directions display unit for display thereon.

45. The method according to claim 44, wherein the vehicle on-board mobile information transmitting and receiving unit is a cellular telephone.

46. The method according to claim 44, further comprising:

further providing in (a.):

at least one reconnaissance satellite in outer space for obtaining aerial photographic image data of at least one vehicular traffic stream; showing traffic density, and for transmitting the aerial photographic image data of the at least one vehicular traffic stream from outer space to the route guidance web server; and a vehicle on-board global positioning system (GPS) that is part of the vehicle on-board sub-system, for providing current vehicle location information about that vehicle to the vehicle on-board route guidance computer; and utilizing the route guidance web server to compute values of a regional traffic density table, which the route guidance web server provides to the vehicle on-board route guidance computer.

47. A method for providing route guidance to a vehicle comprising the steps of:

a.) providing a route guidance system including a vehicle on-board route guidance system in each of at least one vehicle to which route guidance is to be provided, the vehicle on-board route guidance system including at least a vehicle on-board information transmitting and receiving unit, a vehicle on-board route selecting computer, and a vehicle on-board directions display unit; and the route guidance system further including a base system including at least a route guidance web server, a digital cellular operator, a traffic flow simulator, and a traffic current velocity computer;

b.) inputting desired destination location information for at least one particular vehicle into the route selecting computer;

c.) transmitting a recognition message from the vehicle on-board information transmitting and receiving unit to the route guidance web server by way of the digital cellular operator to establish the transmitting vehicle as an active user of the route guidance system;

d.) transmitting a message containing regional average traffic speed information obtained from a regional average traffic speed data table stored in the route guidance web server to the vehicle on-board route selecting computer;

e.) periodically, at selected time periods having a predetermined time interval and frequency, transmitting a trigger message from the vehicle on-board information transmitting and receiving unit to the digital cellular operator;

f.) utilizing the digital cellular operator to locate the position of a particular vehicle;

g.) utilizing the digital cellular operator to transmit the vehicle's present location to the route guidance web server and to the vehicle on-board directions display unit;

h.) utilizing the vehicle on-board route selecting computer to compute a route and an estimated arrival time;

i.) utilizing the digital cellular operator to transmit the selected route to the route guidance web server;

j.) utilizing the traffic flow simulator to recompute entries for an anticipated average traffic speed table based on a selected route;

k.) utilizing the traffic current velocity computer to recompute a current average traffic speed table based on a vehicle's location at pairs of consecutive time periods at which vehicle location is measured;

l.) utilizing the vehicle on-board route selecting computer to derive certain information, including specific vehicle directions and an estimated arrival time, from the selected route, and to provide the derived information to the vehicle on-board directions display unit for display thereon.

48. The method according to claim 47, wherein the vehicle on-board mobile information transmitting and receiving unit is a cellular telephone.

49. The method according to claim 47, further comprising:

further providing in (a.):

at least one reconnaissance satellite in outer space for obtaining aerial photographic image data of at least one vehicular traffic stream; showing traffic density, and for transmitting the aerial photographic image data of the at least one vehicular traffic stream from outer space to the route guidance web server; and a vehicle on-board global positioning system (GPS) that is part of the vehicle on-board sub-system, for providing current vehicle location information about that vehicle to the vehicle on-board direction display generator; and utilizing the route guidance web server to compute values of a regional traffic density table, which the route guidance web server provides to the vehicle on-board direction display generator.

50. A vehicle route guidance system comprising:

a.) at least one reconnaissance satellite in outer space:

i.) for obtaining aerial photographic image data of at least one vehicular traffic stream; and ii.) for transmitting the aerial photographic image data of the at least one vehicular traffic stream from outer space to a route guidance web server;

b.) a route guidance web server:

i.) for receiving and storing transmitted aerial photographic image data of the at least one vehicular traffic stream from the reconnaissance satellite in outer space;

ii.) for receiving and storing information, including at least a selected route for at least one vehicle that participates in the system, the information being received from at least one of a plurality of vehicles moving in at least one traffic stream of vehicles;

iii.) for providing vehicle location information for at least two consecutive locations of a vehicle to an average traffic speed table and position location map information storage means and computer;

iv.) for computing certain general traffic parameters and certain individual vehicle route data from the received information;

v.) for receiving traffic light control information from a central traffic light control computer;

vi.) for receiving traffic speed information from the average traffic speed table and position location map information storage means and computer; and vii.) for use in computing values for a regional traffic density table for transmission to a vehicle on-board route guidance computer;

j.) a central traffic light control computer:

i.) for receiving and storing traffic information from the route guidance web server;

ii.) for providing traffic light control information to the route guidance web server; and iii.) for providing command signals to from at least one and up to a plurality of traffic lights;

k.) means for storing information about an average traffic speed table and a position location map, for receiving and storing vehicle position information from the route guidance web server; and l.) a vehicle on-board sub-system in each of at least one vehicle that participates in the system, the vehicle on-board sub-system including:

i.) a vehicle on-board Global Positioning System (GPS) unit for determining the current location of the vehicle at a point in time and for transmitting information about the current location of the vehicle to a vehicle on-board route guidance computer;

ii.) a vehicle on-board route guidance computer:

for receiving user input destination location information for that vehicle;

for receiving vehicle location information from that vehicle's on-board GPS unit;

for receiving regional traffic density values for that vehicle from the route guidance web server;

for transmitting the selected route information for that vehicle to the route guidance web server; and for transmitting the computed route information for that vehicle to a vehicle on-board driver direction display unit; and iii.) a vehicle on-board driver direction display unit:

for receiving computed route information for that vehicle from the vehicle on-board route guidance computer; and for displaying that information to a driver of that vehicle.

* * * * *